Patented Feb. 17, 1931

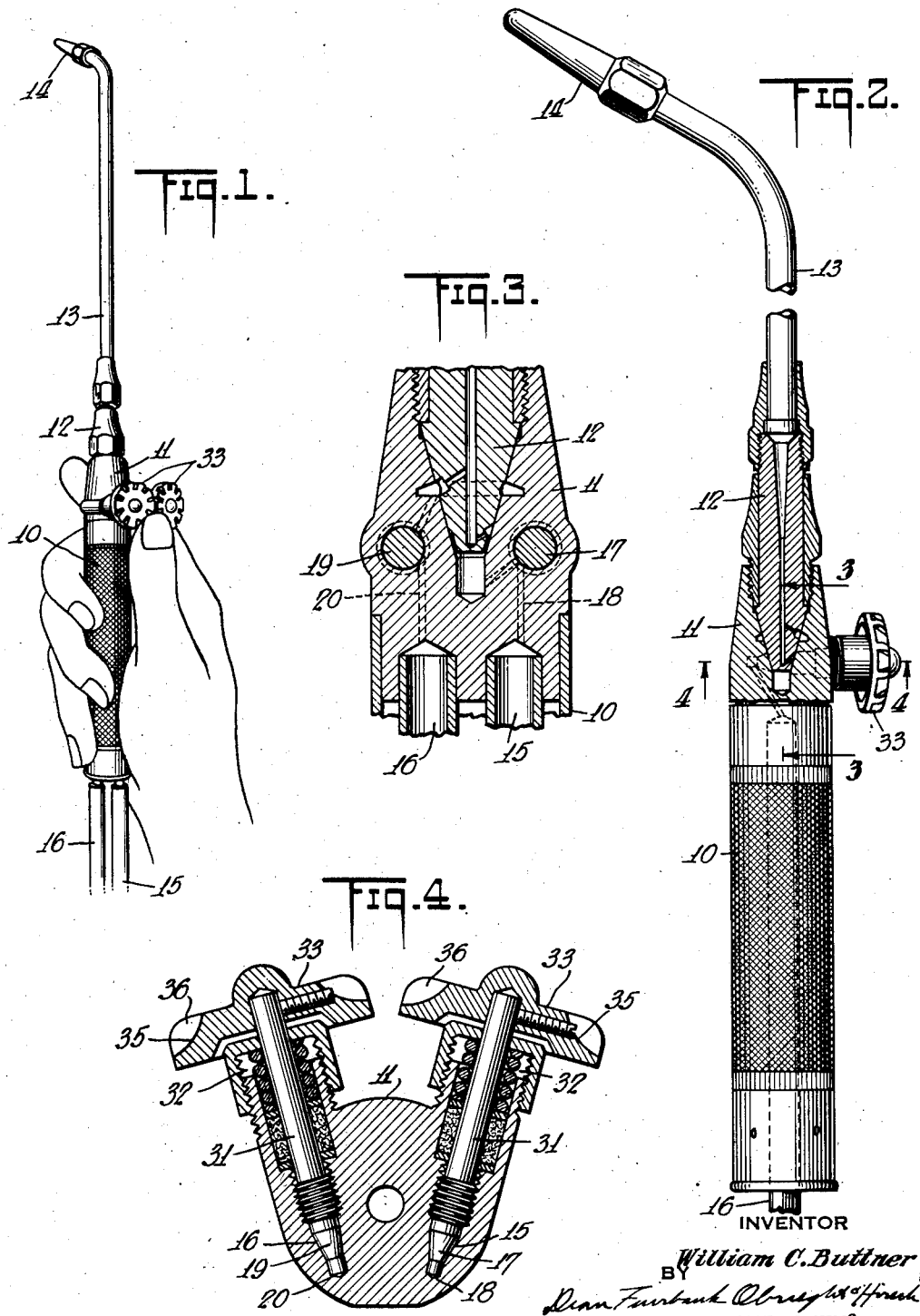

1,793,052

UNITED STATES PATENT OFFICE

WILLIAM C. BUTTNER, OF WINNETKA, ILLINOIS, ASSIGNOR TO THE BASTIAN-BLESSING COMPANY, OF CHICAGO, ILLINOIS, A CORPORATION OF ILLINOIS

TORCH

Application filed February 17, 1930. Serial No. 429,072.

The present invention pertains to oxy-acetylene torches, and more particularly to the means employed for controlng the delivery of the two gases to the mixing passage or chamber.

Torches of this character usually have separate oxygen and acetylene gas passages terminating in a mixing chamber wherein the gases are mixed and from which they pass to the outlet where the mixture burns. The separate passages have separate valves to control the flow of the gases, and to maintain the proper character and size of the flame.

Individual adjustments of the valves are necessary to obtain an oxidizing, carbonizing or neutral flame as occasion may require, and adjustment of both valves is necessary to control the flame size in accordance with the character of the work and the gas pressures.

The ordinary torch is usually held in one hand, the operator employing the other hand to hold the welding rod or one of the parts to be welded. If adjustment of either or both valves is required the operator must use the hand in which the rod or other part is held and this is not only inconvenient but interrupts the progress of the work.

The main object of this invention is to position, design and arrange the valves so that they may be operated separately or simultaneously by a single digit, preferably the thumb, of the same hand which is used to support and guide the torch, and without releasing or changing the grip on the torch. Thus the adjustment of either valve may be made, independently of the other, or the two valves may be opened or closed simultaneously to any extent and by a single movement of the thumb without the use of the other hand and without in any way interrupting the progress of the work.

A preferred form is illustrated in the accompanying drawings in which

Fig. 1 is a perspective view of the torch embodying my invention and illustrating the manner in which the torch may be held and adjusted, Fig. 2 is a side view partly in section, Fig. 3 is a detail longitudinal sectional view taken on the line 3—3 of Fig. 2, and Fig. 4 is a detail transverse sectional view taken on the line 4—4 of Fig. 2.

The torch includes a main body portion 10 which forms a handle by which the torch is supported and guided. A valve block 11 is disposed at the front end of the handle. In the particular form illustrated the mixing chamber 12 is directly in front of the valve block and a detachable conduit 13 leads therefrom to the tip or nozzle 14. The parts by which the gases flowing from the valve block are mixed, and the flame is directed against the work, form no novel portions of this invention and may be varied within very wide limits.

The oxygen and acetylene supply pipes extend through the handle to the valve block 11. Oxygen flows from the conduit 15 through a passage 18 to the oxygen control valve 17 and the acetylene gas flows from the conduit 16 through a passage 20 to the acetylene controlling valve 19. The gases flow from the valves to the mixing chamber 12 and thence to the tip by any suitable construction.

The valves 17 and 19 are in the valve block and are of the needle type. Each comprises a valve stem 31 projecting through a stuffing box or gland 32. The ends of these valve stems above their respective stuffing box are each provided with an operating head 33 preferably in the form of a disc having a plurality of deeply cut recesses 35 which preferably extend radially through the periphery thereof to provide thumb engaging shoulders 36.

The stems of the valves 17 and 19 extend upwardly and they are arranged at an acute angle with respect to each other. The angle therebetween is such that the peripheral edges of the operating discs or wheels thereof are closely adjacent each other, are at least close enough so that they may be simultaneously engaged by the thumb of the hand of the operator manipulating the torch as is shown in Fig. 1.

As a very important feature of the invention these two valves are threaded in the valve block, one by a left hand thread and the other by a right hand thread so that they are rotated in opposite directions to open and likewise in opposite directions to close.

The torch may be grapsed in one hand by the operator with the thumb adjacent to the two operating discs as illustrated in Fig. 1. By engagement of the thumb with the two operating discs and pulling or pushing with the thumb, the two valves may be opened or closed simultaneously and to exactly the same extent. By moving the thumb very slightly to one side so that it engages only one disc one valve may be operated to open or close it to any extent without moving the other valve. In this manner, the proportioning of the oxygen and acetylene may be varied and the size of the flame may be altered as desired merely by a movement of the thumb of the hand which grasps the torch. During the adjustment the flame may continue to play on the work and the operator need not remove the welding rod from the flame. Thus time is saved as there is no interruption of the work.

The relatively deep recesses 35 formed in the operating elements 33 to present operating shoulders as distinguished from knurled or milled operating elements as commonly employed, insure positive operating engagement of the thumb with the operating elements.

I have referred to the gases as oxygen and acetylene, but it will, of course, be understood that they are merely examples of any suitable combustion supporting and combustible gases which may be used.

Having thus described my invention, what I claim as new and desire to secure by Letters Patent is:

A welding torch including a handle adapted to be grasped in the hand, a valve block having a pair of needle valves at the front end of the handle and having their stems extending upwardly and provided with deeply roughened operating discs closely adjacent to each other whereby the thumb of the hand grasping the handle may press down upon both discs at the same time, said valve stems having threaded engagement with said valve block, one stem having a right hand thread and the other valve stem having a left hand thread whereby the simultaneous rotations of both valve stems by a movement of the thumb may open or close both valves to the same extent, each valve and its stem and disc being free of the other whereby either valve may be opened or closed independently of the other by the movement of the thumb.

Signed at Chicago, in the county of Cook and State of Illinois, this 13th day of February, A. D. 1930.

WILLIAM C. BUTTNER.